US011979506B2

United States Patent
Zhang et al.

(10) Patent No.: US 11,979,506 B2
(45) Date of Patent: May 7, 2024

(54) METHOD FOR STATISTICAL ANALYSIS OF AGGREGATE ENCRYPTED DATA WITH KEY-LEAKAGE RESILIENCE FOR SMART GRIDS

(71) Applicant: SOUTHWEST PETROLEUM UNIVERSITY, Sichuan (CN)

(72) Inventors: Xiaojun Zhang, Sichuan (CN); Chao Huang, Sichuan (CN); Jingwei Zhang, Sichuan (CN); Jie Gong, Sichuan (CN); Ziyu Zhou, Sichuan (CN); Shuang Zheng, Sichuan (CN); Jie Zhao, Sichuan (CN)

(73) Assignee: SOUTHWEST PETROLEUM UNIVERSITY, Sichuan (CN)

( * ) Notice: Subject to any disclaimer, the term of this patent is extended or adjusted under 35 U.S.C. 154(b) by 369 days.

(21) Appl. No.: 17/431,133

(22) PCT Filed: Jul. 14, 2020

(86) PCT No.: PCT/CN2020/101889
§ 371 (c)(1),
(2) Date: Aug. 13, 2021

(87) PCT Pub. No.: WO2021/227241
PCT Pub. Date: Nov. 18, 2021

(65) Prior Publication Data
US 2022/0329438 A1   Oct. 13, 2022

(30) Foreign Application Priority Data

May 13, 2020   (CN) .......................... 202010399781.1

(51) Int. Cl.
*H04L 9/32*   (2006.01)
*H04L 9/00*   (2022.01)
(Continued)

(52) U.S. Cl.
CPC ............ *H04L 9/3247* (2013.01); *H04L 9/008* (2013.01); *H04L 9/0618* (2013.01);
(Continued)

(58) Field of Classification Search
CPC ..... H04L 9/3247; H04L 9/008; H04L 9/0618; H04L 9/0643; H04L 9/14; H04L 9/3073
See application file for complete search history.

(56) References Cited

U.S. PATENT DOCUMENTS

2012/0310860 A1* 12/2012 Kim .................. G06Q 30/0202
                                                  705/412
2013/0124850 A1*  5/2013 Gomez Marmol ..... H04L 9/008
                                                  713/150
(Continued)

OTHER PUBLICATIONS

N. Saputro and K. Akkaya, "Performance evaluation of Smart Grid data aggregation via homomorphic encryption," 2012 IEEE Wireless Communications and Networking Conference (WCNC), Paris, France, 2012, pp. 2945-2950. (Year: 2012).*

(Continued)

*Primary Examiner* — Vance M Little
(74) *Attorney, Agent, or Firm* — Zhigang Ma

(57) ABSTRACT

In a method for statistical analysis of aggregate encrypted data with key-leakage resilience for smart grids, every user area is managed by a fog node which plays the role of data aggregation gateway and data relay. All the users' electricity consumption data sent by smart meters in the same user area are firstly aggregated by the fog node to generate a fog-level aggregate ciphertext. Then the fog node further generates a digital signature for the fog-level aggregate ciphertext and sends these data to a cloud server for long-time storage. The cloud server stores all the aggregate ciphertexts and digital signatures received from different user areas in its database, and provides data query and statistical analysis services for the control center of smart grids. On the premise of without (Continued)

violating users' privacy, the cloud server could provide enough information for the control center, enabling it to compute the sum, arithmetic mean and variance of all users' data in specified areas in a privacy-preserving way.

9 Claims, 1 Drawing Sheet

(51) Int. Cl.
    *H04L 9/06* (2006.01)
    *H04L 9/14* (2006.01)
    *H04L 9/30* (2006.01)

(52) U.S. Cl.
    CPC .............. *H04L 9/0643* (2013.01); *H04L 9/14* (2013.01); *H04L 9/3073* (2013.01)

(56) References Cited

U.S. PATENT DOCUMENTS

2014/0310524 A1* 10/2014 Yamanaka ............ H04L 63/123 713/170
2017/0019248 A1* 1/2017 Mustafa .................. H04L 9/008
2018/0060976 A1* 3/2018 Chu ........................ H04L 9/085
2020/0074096 A1* 3/2020 Rao ..................... G06F 16/1744

OTHER PUBLICATIONS

Wang, Y., Luo, F., Dong, Z., Tong, Z. and Qiao, Y. (2019), Distributed meter data aggregation framework based on Blockchain and homomorphic encryption. IET Cyber-Physical Systems: Theory & Applications, 4: 30-37. (Year: 2019).*

F. Li, B. Luo and P. Liu, "Secure Information Aggregation for Smart Grids Using Homomorphic Encryption," 2010 First IEEE International Conference on Smart Grid Communications, Gaithersburg, MD, USA, 2010, pp. 327-332 (Year: 2010).*

Y. Chen, J. -F. Martínez-Ortega, P. Castillejo and L. López, "A Homomorphic-Based Multiple Data Aggregation Scheme for Smart Grid," in IEEE Sensors Journal, vol. 19, No. 10, pp. 3921-3929, 15 May 15, 2019 (Year: 2019).*

L. Zhu et al., "Privacy-Preserving Authentication and Data Aggregation for Fog-Based Smart Grid," in IEEE Communications Magazine, vol. 57, No. 6, pp. 80-85, Jun. 2019 (Year: 2019).*

* cited by examiner

METHOD FOR STATISTICAL ANALYSIS OF AGGREGATE ENCRYPTED DATA WITH KEY-LEAKAGE RESILIENCE FOR SMART GRIDS

CROSS-REFERENCE TO RELATED APPLICATIONS

The present application is the U.S. national phase of PCT Application No. PCT/CN2020/101889 filed on Jul. 14, 2020, which claims priority to Chinese Patent Application No. 202010399781.1 filed on May 13, 2020, the disclosure of which are incorporated herein by reference in their entireties.

TECHNICAL FIELD

This invention belongs to technical domains of big data analysis for smart grids and information security, specifically it involves a method for statistical analysis of aggregate encrypted data with key-leakage resilience for smart grids.

BACKGROUND

Smart grid introduces many emerging information technologies, e.g., cloud computing, artificial intelligence, machine learning, on the basis of conventional power grid systems. It builds an advanced metering infrastructure (AMI) on the traditional system framework to bidirectionally transfer user's electricity consumption data and feedback commands, electricity price information from the control center of smart grid. The core of AMI is an embedded device called smart meter which is installed in the house of users to periodically collect users' electricity consumption data and report them to the control center. The control center uses various data analysis techniques to obtain valuable information from the collected fine-grained user data. With the analysis results, the control center could monitor the situation of smart grid system and dynamically adjust and optimize power generation and distribution. On the other hand, the control center could also dispatch some feedback commands, electricity price information and blackout information to the smart meters via the data transmission channel. By interacting with the smart meters, users could obtain these information and further adjust electricity usage plan of the whole household.

While smart grid employs different techniques to collect and transmit users' electricity consumption data, it introduces many security threats at the same time. Since users' electricity consumption data are transmitted by an open wireless network, user privacy, data confidentiality and data integrity are all threatened during transmission. On one hand, there may exist external adversaries who eavesdrops the communication channel and intercepts, replaces and tampers with users' electricity consumption data, which violates user privacy and even cause chaos to smart grid systems. On the other hand, there may also exist internal adversaries who steals private key of the control center, and with which they could successfully decrypt the ciphertext of any single user, violating data confidentiality and user privacy. Apart from these security threats, with the intrinsic characteristics of smart grid systems including massive user amount, high data density, high-frequency data collection and transmission, low data processing latency, it is a critical problem that how to design a method for efficient verifiable data aggregation and statistical analysis.

Besides, to preserve data confidentiality and user privacy users' electricity consumption data are usually encrypted using various methods immediately at smart meter side, this will cause that data lose their applicability to some extent. After the ciphertexts are aggregated by the aggregator gateway, the control center could only obtain limited statistical information from received aggregate results. Thus, a practical method for data aggregation of electricity consumption data for smart grid is supposed to achieve fundamental security requirements including data confidentiality, integrity and user privacy, and provides the control center with stronger data analysis ability. In terms of performance, it is demanded that data aggregation procedure, integrity verification procedure, decryption and data analysis procedure are as efficient as possible.

Recently, researchers propose many data aggregation methods using different techniques. Homomorphic encryption technique is widely used in the construction of data aggregation algorithms. With the homomorphism property of homomorphic encryption algorithms, when user data are encrypted to ciphertexts, they can be efficiently aggregated and the control center could directly decrypt aggregate ciphertext to get some statistical results with no need of decryption to ciphertext of single user, which effectively preserve user privacy and data confidentiality. In 2012, Lu et al. proposed a data aggregation scheme for smart grids using Paillier homomorphic encryption algorithm. In their scheme, a special superincreasing sequence is combined with Paillier encryption algorithm to achieve multi-dimension data encryption and aggregation. However, to preserve data integrity, the aggregate gateway needs to compute several bilinear pairing operations which causes high computational overhead. Chen et al. presented a privacy-preserving multi-functional data aggregation scheme using Boneh-Goh-Nissim (BGN) homomorphic encryption algorithm, their scheme leverages the one-lime multiplicative homomorphism and additive homomorphism properties, enabling the control center to obtain sum and variance of user data by decrypting the aggregate ciphertext.

SUMMARY

The purpose of this invention is overcoming the drawbacks of existing techniques and providing a method for statistical analysis of aggregate encrypted data with key-leakage resilience for smart grids.

The purpose of this invention is achieved by the following technical scheme: the method for statistical analysis of aggregate encrypted data with key-leakage resilience for smart grids includes:

S1. System Initialization: A trust center generates the security parameters involved in this method and distributes public-private key pairs to communication entities. The mentioned communication entities include smart meters, fog nodes, a cloud server and the control center. Then the trust center publishes all public parameters and sends private keys to corresponding communication entities via a secure channel.

S2. Data Reporting: Smart meters encrypt collected user's electricity consumption data to generate a ciphertext, generate a digital signature for the ciphertext and send the ciphertext and signature as reported data to corresponding fog node for data aggregation.

S3. Fog-level Aggregation: After the fog node receives all reported data from smart meters in its managed area in the prespecified period, it firstly verifies all the digital signatures of reported data. If the verification passes, fog node aggregates all the data ciphertexts of reported data to generate the fog-level aggregate ciphertext and signs the aggregate value to generate a fog-level signature. Then fog node sends the fog-level aggregate ciphertext and fog-level signature to the cloud server for long-time storage.

S4. Data Analysis Request and Response: The control center sends a challenge message which includes a user area list for data analysis and a random chosen coefficient sequence to the cloud server. The cloud server abstracts fog-level aggregate data from its database according to the received user area list. Then it firstly generates a cloud-level aggregate ciphertext and secondly signs the aggregate value to generate verifiable response information using fog-level signatures and received coefficient sequence. Finally it sends these data to the control center.

S5 Verification and Decryption: The control center firstly verifies the response information returned by the cloud server to confirm the data integrity of cloud-level aggregate ciphertext. If the verification passes, control center decrypts the aggregate ciphertext and further computes the arithmetic mean and variance of all users' electricity consumption data within the specified user area list.

It is priority that the security parameters in step S1 include security parameters of key-leakage resilience homomorphic encryption algorithm and security parameters of linear homomorphic digital signature.

It is priority that in step S2, smart meters combine a random blinding technique with the homomorphic encryption algorithm to encrypt user's electricity consumption data. In step S5, the control center uses privacy-preserving decryption algorithm to decrypt response data received from the cloud server.

It is priority that in step S3, the fog nodes use a batch verification method to check the signatures of ciphertexts from smart meters.

It is priority that step S1 includes:

S11. Given a security parameter k, the trust authority generates parameters of a key-leakage resilient homomorphic encryption algorithm (n, g, G, $G_T$, e), where e:G× G→$G_T$ is an admissible bilinear map, G and $G_T$ are both cyclic groups with composite order n, and n=$p_1 p_2$, $p_1$ and $p_2$ are both big prime numbers with k-bit length, g is a generator of group G. The trust authority computes public key of the control center as $\xi=g^{p_2}$.

S12. The trust authority determines an elliptic curve E over the finite field $F_p$ and a bilinear map $\tilde{e}$:$G_1 \times G_1 \to G_2$ based on E, where p is a big prime number, $G_1$ is an additive cyclic group with order q, $G_2$ is a multiplicative cyclic group with order q. The trust authority selects a generator P of group $G_1$, and sets the number of fog nodes in the system to be N and the number of smart meters in each user area to be l. The trust authority sets two secure collision-resistant hash functions: $H_1$:{0,1}*→$G_1$, $h_1$:{0,1}*→$Z_q$*, where {0, 1}* denotes the set of binary strings with arbitrary length, $Z_q$* is the multiplicative cyclic group which is composed of residue systems relatively prime to q.

S13. The trust authority randomly chooses five constants: $\alpha$, $\beta$, $\gamma$, $\delta$, $\zeta$ satisfying $\alpha \cdot \beta + \gamma \cdot \delta + \zeta = n$, where $\alpha \in Z_n$, $\beta \in Z_n$, $\gamma \in Z_n$, $\delta \in Z_n$, $\zeta \in Z_n$, computes public parameters $f=g^\alpha$ and $\varepsilon=g^\gamma$. Besides, it selects a private key $y_i \in Z_q$ for digital signature algorithm for each fog node $FN_i$ and computes the corresponding public key $Y_i = y_i P$ for signature verification.

S14. For each smart meter $SM_{ij}$ with a unique identifier $ID_{SM_{ij}}$, the trust authority randomly selects a private key $y_{ij} \in Z_q$ for digital signature for it, where $Z_q$ is the ring of residue classes modulo q, $SM_{ij}$ is the j-th smart meter in the user area corresponding to the i-th fog node $FN_i$. The trust authority computes the public key $Y_{ij}=y_{ij}P$ for signature verification for $SM_{ij}$, and selects two random numbers $\pi_{ij}$ and $s_{ij}$ for each $SM_{ij}$, where $\pi_{ij} \in Z_n$, $s_{ij} \in Z_n$, $\alpha \cdot \pi_{ij} + \gamma \cdot s_{ij} = \zeta$, $\Sigma_{j} \pi_{ij} \leq \beta$, $\Sigma_{j} s_{ij} \leq \delta$, after that it computes two parameters $\pi_i = \beta - \Sigma_{j} \pi_{ij}$ and $s_i = \delta - \Sigma_{j} s_{ij}$ for each fog node $FN_i$.

S15. The trust authority sends the private key $p_1$ to the control center, private key $y_{ij}$, secret parameters $\pi_{ij}$ and $s_{ij}$ to smart meter $SM_{ij}$, and private key $y_i$, secret parameters $\pi_i$ and $s_i$ to the fog node $FN_i$ via a secure channel.

It is priority that step S2 includes:

S21. For each smart meter $SM_{ij}$ with a unique identifier $ID_{SM_{ij}}$, it randomly selects a number $r_{ij} \in Z_n$ and generates a ciphertext as $c_{ij} = f^{\pi_{ij}} \varepsilon^{s_{ij}} g^{m_{ij}} \xi^{r_{ij}} \in G$, where $m_{ij} \in$ [0, MAX] is the electricity consumption data of user, MAX is a prespecified upper bound of all users' electricity consumption data, MAX is far less than $p_2$;

S22. The Smart meter $SM_{ij}$ acquires current timestamp $t_{ij}$, and uses the private key $y_{ij}$ to compute a digital signature as $\sigma_{ij} = y_{ij} H(ID_{SM_{ij}} \| c_{ij} \| t_{ij})$;

S23. The smart meter $SM_{ij}$ sends {$ID_{SM_{ij}}$, $c_{ij}$, $\sigma_{ij}$, $t_{ij}$} to the corresponding fog node $FN_i$.

It is priority that step S3 includes:

S31. After the fog node $FN_i$ receives data {$ID_{SM_{ij}}$, $c_{ij}$, $\sigma_{ij}$, $t_{ij}$} from all smart meters $SM_{ij}$, J=1, 2, . . . $\ell$ of the user area in the time period, it verifies all the signatures $\sigma_{ij}$ sent by all smart meters $SM_{ij}$ using the following verification equation:

$$\tilde{e}\left(\sum_{j=1}^{\ell} \sigma_{ij}, P\right) = \sum_{j=1}^{\ell} \tilde{e}(H_1(ID_{SM_{ij}} \| c_{ij} \| t_{ij}), Y_{ij});$$

S32. If the verification equation in step S31 passes, then the fog node $FN_i$ computes the first intermediate state ciphertext as $c_i = \Pi_{j} c_{ij}$ and the second intermediate state ciphertext as $C_i = f^{\pi_i} \varepsilon^{s_i} c_i$.

S33. The fog node $FN_i$ generates fog-level aggregate ciphertexts, which include the first fog-level aggregate ciphertext as $CT_i = C_i^i \cdot c_i$ and the second fog-level aggregate ciphertext as $SCT_i = \Pi_{j} e(c_{ij} C_i, c_{ij} C_i)$.

S34. The fog node $FN_i$ computes a fog-level digital signature as $\sigma_i = (y_i + h_1(CT_i \| SCT_i)) H_1(ID_{CS})$, where $ID_{CS}$ is a unique identifier of the cloud server.

S35. The fog node $FN_i$ sends all the aggregate data {$CT_i$, $SCT_i$, $\sigma_i$} to cloud server for long-time storage.

It is priority that step S4 includes:

S41. The control center generates a challenge message {L, chal}, and sends it to the cloud server, where L is a list of user areas, L={$\vartheta_1$, $\vartheta_2$, . . . , $\vartheta_\theta$}⊆{1, 2, . . . , N}, chal={$\eta_{\vartheta_1}$, $\eta_{\vartheta_2}$, . . . , $\eta_{\vartheta_\theta}$, $\lambda$, $\mu$} is a sequence of random matching coefficients of length $\vartheta$.

S42. The cloud server generates cloud-level aggregate ciphertexts, which include the first aggregate ciphertext $CT = \Pi_{\vartheta \in L} CT_\vartheta$, the second aggregate ciphertext $PCT = \Pi_{\vartheta \in L} e(CT_\vartheta, CT_\vartheta)$ and the third aggregate ciphertext $SCT = \Pi_{\vartheta \in L} SCT_\vartheta$.

S43. The cloud server uses random coefficients $\lambda$ and $\mu$, the cloud-level aggregate ciphertext to produce two random values $\eta_{\vartheta_{\theta_1}} = h_1(CT \| \lambda)$ and $\eta_{\vartheta_{\theta_2}} = h_1(PCT \| SCT \| \mu)$. And it gets the signatures {$\sigma_{\vartheta_1}$, $\sigma_{\vartheta_2}$, . . . , $\sigma_{\vartheta_\theta}$} of fog-level aggregate ciphertexts from database according to list L and computes an aggregate signature $\sigma = \Sigma_{\vartheta \in L}(\eta_\vartheta H_1(ID_{CS}) + \sigma_\vartheta)$.

S44. The cloud server computes a combined hash value as $h = \Sigma_{\vartheta \in L} h_1(CT_\vartheta \| SCT_\vartheta)$ and a combined public key as $Y = \Sigma_{\vartheta \in L} Y_\vartheta$.

S45. The cloud server sends the response data Agg={σ, h, Y, CT, PCT, SCT} to the control center.

It is priority that step S5 includes:

S51. The control center uses random coefficients λ and μ, and the cloud-level aggregate ciphertext to produce $\eta_{\vartheta\theta-1}=h_1(CT\|\lambda)$ and $\eta_{\vartheta_\theta}=h_1(PCT\|SCT\|\mu)$ in the same way, and computes the sum of random matching coefficients as $\eta=\Sigma_{\vartheta\in L}\eta_\vartheta$, then it verifies the signatures by the following verification equation:

$$\tilde{e}(\sigma,P)=\tilde{e}((h+\eta)H_1(ID_{CS}),P)\cdot\tilde{e}(H_1(ID_{CS}),Y)$$

S52. If the verification equation in step S51 passes, the control center uses key-leakage resilient decryption algorithm to compute the discrete logarithm of $CT^{p_1}$ of base $\hat{g}=g^{p_1}$, and divides the result by $\ell+1$ to get the sum M of all users' electricity consumption data in the user areas specified in the user area list, namely $M=\log_{\hat{g}}^{CT^{p_1}}/(\ell+1)$.

S53. The control center uses private key $p_1$ to compute discrete logarithms $\log_{\hat{e}}^{SCT^{p_1}}$ and $\log_{\hat{e}}^{PCT^{p_1}}$ respectively, where $\hat{e}=e(g,g)^{p_1}$ is a bilinear map value, and computes the sum of squares of all users' electricity consumption data in the user areas specified in the user area list, namely $M^2=\Sigma_{\vartheta\in L}\Sigma_{j=1}^{\ell}m_{\vartheta_j}^2=\log_{\hat{e}}^{SCT^{p_1}}-(\ell+2)\cdot(\log_{\hat{e}}^{PCT^{p_1}}/(\ell+1)^2)$.

S54. The control center computes the arithmetic mean of all users' data as $$\bar{m}=\frac{M}{\theta\cdot\ell}.$$

S55. The control center computes the variance of all users' data as $$\text{var}(m)=\frac{M^2}{\theta\cdot\ell}-m^2.$$

The beneficial effects of this invention includes:

(1) This invention uses key-leakage resilience homomorphic encryption algorithm to encrypt users' electricity consumption data, smart meters combine with the random blinding technique when generating the ciphertext by public key of the control center. Even though the corresponding private key of control center is accidentally leaked in some special cases, any single ciphertext is still not able to be decrypted, which can effectively preserve user privacy and data confidentiality.

(2) This invention designs a lightweight batch verification technique for checking data integrity, enabling the control center to verify the data integrity of all ciphertexts with constant time complexity which is independent of the number of user areas and smart meters in a single user area.

(3) This invention can provides flexible data statistical analysis and query functionality for the control center such that the control center or a service provider could selectively specify the range of interested user areas, specifically it could specify an arbitrary subset of indexes of user areas for statistical analysis on demand. Besides, the cloud server could provide enough information for the control center without violating privacy of any single user, with which the control center could compute the sum, arithmetic mean and variance of all users' electricity consumption data in specified user areas.

(4) This invention achieves high performance such that the control center could efficiently verify the data integrity of encrypted aggregate data with constant computational costs and conduct fast statistical analysis even though the amount of users and communication data is large.

(5) This invention, i.e., the method for statistical analysis of aggregate encrypted data with key-leakage resilience for smart grids, s based on fog-computing framework, it takes advantage of the cloud server and fog nodes deployed at the edge of networks to release computational and communication burdens of business systems.

DETAILED DESCRIPTION

This section combines with an implementation instance to clearly and completely describe the technical scheme of this invention. Apparently, the described implementation instance is just a partial instance of this invention which does not cover all possibilities. Based on the implementation instance of this invention, all other implementation instances obtained by technicians of this field without any creative efforts fall in the range protected by this invention.

Figure 1:
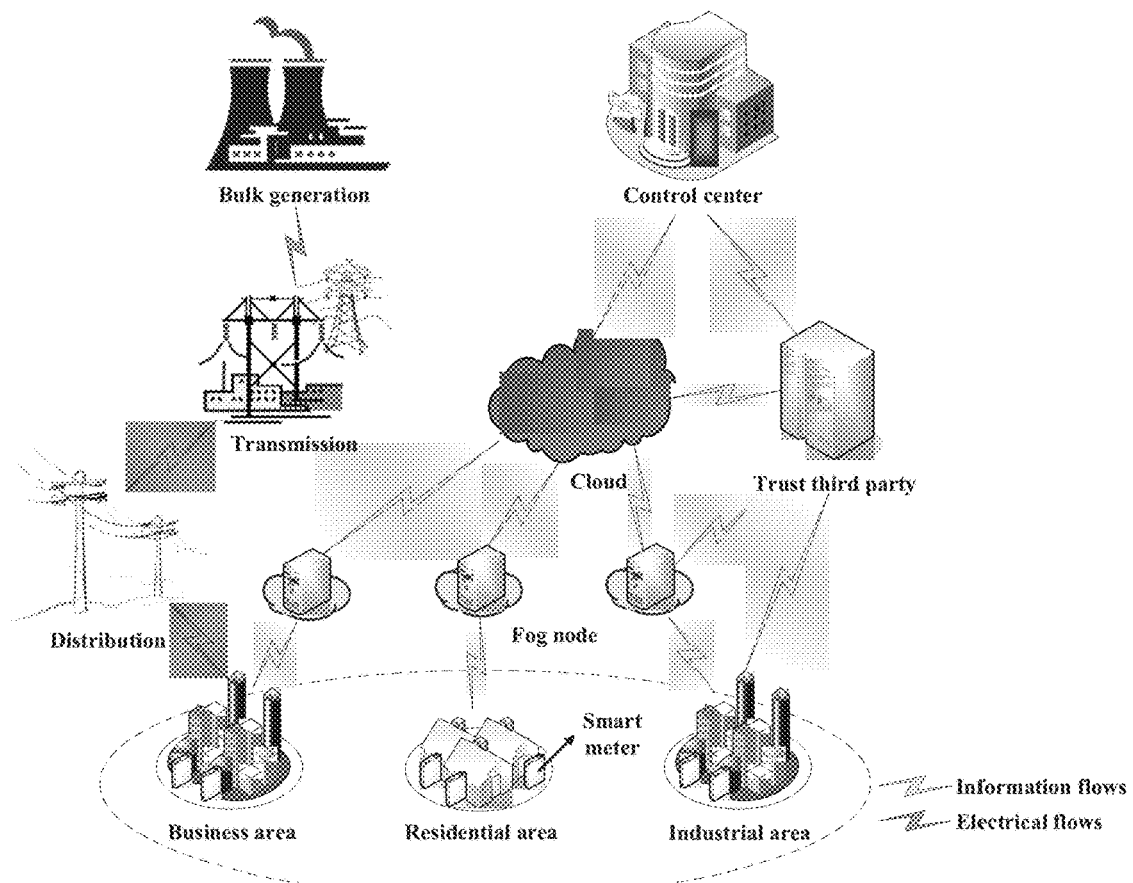
FIG. 1 is a schematic diagram of a smart grid system.
Figure 2:
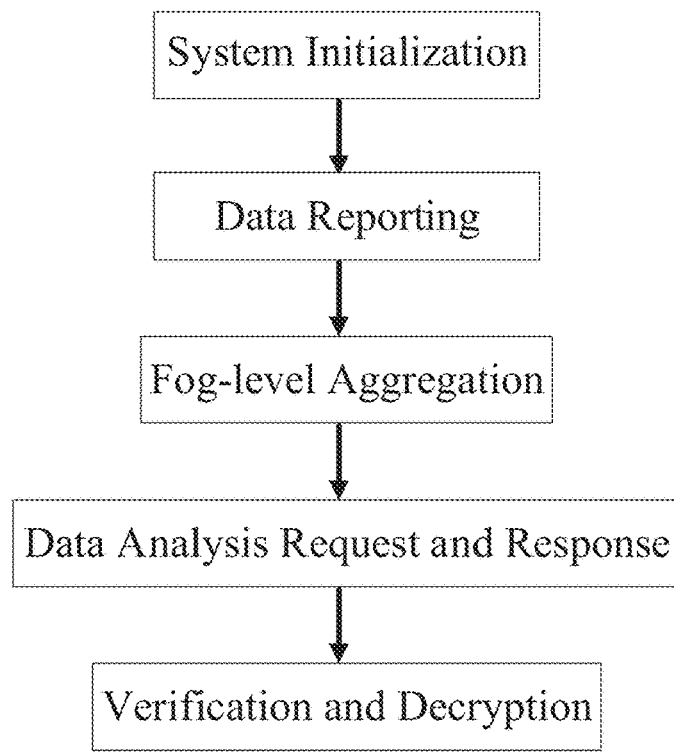
FIG. 2 is the flow chart of this invention.

This invention provides a method for statistical analysis of aggregate encrypted data with key-leakage resilience for smart grids:

As illustrated by FIG. 1 and FIG. 2, the method for statistical analysis of aggregate encrypted data with key-leakage resilience for smart grids includes:

S1. System Initialization: A trust center generates the security parameters involved in this method and distributes public-private key pairs to communication entities. The mentioned communication entities include smart meters, fog nodes, a cloud server and the control center. Then the trust center publishes all public parameters and sends private keys to corresponding communication entities via a secure channel.

In some implementation instances, the security parameters in step S1 include security parameters of a key-leakage resilient homomorphic encryption algorithm and security parameters of a linear homomorphic digital signature algorithm.

The aforementioned step S1 includes:

S11. Given a security parameter k, the trust authority generates parameters of a key-leakage resilient homomorphic encryption algorithm (n, g, G, $G_T$, e), where e:G×G→$G_T$ is an admissible bilinear pairing map, G and $G_T$ are both cyclic groups with composite order n, and n=$p_1p_2$, $p_1$ and $p_2$ are both big prime numbers with k-bit length, g is a generator of group G. The trust authority computes public key of the control center as $\xi=g^{p_2}$.

S12. The trust authority determines an elliptic curve E over the finite field $F_p$ and another bilinear pairing map ẽ: $G_1 \times G_1 \to G_2$ based on E, where p is a big prime number, $G_1$ is an additive cyclic group with order q, $G_2$ is a multiplicative cyclic group with order q. The trust authority selects a generator P of group $G_1$, and sets the number of fog nodes in the system to be N and the number of smart meters in each user area to be $\ell$. The trust authority sets two secure collision-resistant hash functions: $H_1:\{0,1\}^* \to G_1$, $h_1:\{0,1\}^* \to Z_q^*$, where $\{0,1\}^*$ denotes the set of binary strings with arbitrary length, $Z_q^*$ is the multiplicative cyclic group which is composed of residue systems relatively prime to q.

S13. The trust authority randomly chooses five constants: α, β, γ, δ, ζ satisfying α·β+γ·δ+ζ=n, where α∈$Z_n$, β∈$Z_n$, γ∈$Z_n$, δ∈$Z_n$, ζ∈$Z_n$, computes public parameters f=$g^\alpha$ and $\varepsilon=g^\gamma$. Besides, the trust authority selects a private key $y_i \in Z_q$ for digital signature algorithm for each fog node $FN_i$ and computes the corresponding public key $Y_i=y_iP$ for signature verification.

S14. For each smart meter $SM_{ij}$ with a unique identifier $ID_{SM_{ij}}$, the trust authority randomly selects a private key $y_{ij} \in Z_q$ for digital signature, where $Z_q$ is the ring of residue classes modulo q, $SM_{ij}$ is the j-th smart meter in the user area corresponding to the i-th fog node $FN_i$. The trust authority computes the public key $Y_{ij}=y_{ij}P$ for signature verification for $SM_{ij}$, and selects two random numbers $\pi_{ij}$ and $s_{ij}$ for each $SM_{ij}$, where $\pi_{ij} \in Z_n$, $s_{ij} \in Z_n$, $\alpha \cdot \pi_{ij}+\gamma \cdot s_{ij}=\zeta$, $\Sigma_j \pi_{ij} \leq \beta$, $\Sigma_j s_{ij} \leq \delta$, after that it computes two parameters $\pi_i=\beta-\Sigma_j \pi_{ij}$ and $s_i=\delta-\Sigma_j s_{ij}$ for each fog node $FN_i$.

S15. The trust authority sends the private key $p_1$ to the control center, sends private key $y_{ij}$, secret parameters $\pi_{ij}$ and $s_{ij}$ to corresponding smart meter $SM_{ij}$, and sends private key $y_i$, secret parameters $\pi_i$ and $s_i$ to corresponding fog node $FN_i$ via a secure channel, respectively.

S2. Data Reporting: Smart meters encrypt collected user's electricity consumption data to generate a ciphertext, generate a digital signature for the ciphertext and send the ciphertext and signature as reported data to corresponding fog node for data aggregation.

In the step S2 of some implementation instances, smart meters combine a random blinding technique with the key-leakage resilient homomorphic encryption algorithm to encrypt users' electricity consumption data. In step S5, the control center uses corresponding key-leakage resilient homomorphic decryption algorithm to decrypt the response data.

The aforementioned step S2 includes:

S21. For each smart meter $SM_{ij}$, with a unique identifier $ID_{SM_{ij}}$, it randomly selects a number $r_{ij} \in Z_{ij}$, and generates a ciphertext as $c_{ij}=f^{\pi_{ij}} \varepsilon^{s_{ij}} g^{m_{ij}} \zeta^{r_{ij}} \in G$, where $m_{ij} \in [0, MAX]$ is the electricity consumption data of user, MAX is a prespecified upper bound of all users' electricity consumption data, MAX is far less than $p_2$;

S22. The Smart meter $SM_{ij}$, acquires current timestamp $t_{ij}$, and uses the private key $y_{ij}$ to compute a digital signature as $\sigma_{ij}=y_{ij}H(ID_{SM_{ij}}\|c_{ij}\|t_{ij})$;

S23. The smart meter $SM_{ij}$ sends $\{ID_{SM_{ij}}, C_{ij}, \sigma_{ij}, t_{ij}\}$ to the corresponding fog node $FN_i$.

S3. Fog-level Aggregation: After the fog node receives all reported data from smart meters in its managed area in the prespecified period, it firstly verifies all the digital signatures of reported data. If the verification passes, fog node aggregates all the data ciphertexts of reported data to generate the fog-level aggregate ciphertext and signs the aggregate value to generate a fog-level signature. Then fog node sends the fog-level aggregate ciphertext and fog-level signature to the cloud server for long-time storage.

The aforementioned step S3 includes:

S31. After the fog node $FN_i$ receives data $\{ID_{SM_{ij}}, C_{ij}, \sigma_{ij}, t_{ij}\}$ from all smart meters $SM_{ij}$, j=1, 2, ..., $\ell$ of the user area in the time period, it verifies all the signatures $\sigma_{ij}$ sent by all smart meters $SM_{ij}$ using the following verification equation:

$$\tilde{e}\left(\sum_{j=1}^{\ell}\sigma_{ij}, P\right)=\sum_{j=1}^{\ell}\tilde{e}(H_1(ID_{SM_{ij}}\|c_{ij}\|t_{ij}), Y_{ij});$$

S32. If the verification equation in step S31 passes, then the fog node $FN_i$ computes the first intermediate state ciphertext as $c_i=\Pi_j c_{ij}$ and the second intermediate state ciphertext as $C_i=f^{\pi_i}\varepsilon^{s_i}c_i$.

S33. The fog node $FN_i$ generates fog-level aggregate ciphertexts, which include the first fog-level aggregate ciphertext as $CT_i=C_i^t \cdot c_i$ and the second fog-level aggregate ciphertext as $SCT_i=\Pi_j e(c_{ij}C_i, c_{ij}C_i)$.

S34. The fog node $FN_i$ computes a fog-level digital signature as $\sigma_i=(y_i+h_1(CT_i\|SCT_i))H_1(ID_{CS})$, where $ID_{CS}$ is a unique identifier of the cloud server.

S35. The fog node $FN_i$ sends all the aggregate data $\{CT_i, SCT_i, \sigma_i\}$ to cloud server for long-time storage.

S4. Data Analysis Request and Response: The control center sends a challenge message which includes a user area list for data analysis and a random chosen coefficient sequence to the cloud server. The cloud server abstracts fog-level aggregate data from its database according to the received user area list. Then it firstly generates a cloud-level aggregate ciphertext and secondly signs the aggregate value to generate verifiable response information using fog-level signatures and received coefficient sequence. Finally it sends these data to the control center.

The aforementioned step S4 includes:

S41. The control center generates a challenge message $\{L, chal\}$, and sends it to the cloud server, where L is a list of user areas, $L=\{\vartheta_1, \vartheta_2, \ldots, \vartheta_\theta\} \subseteq \{1, 2, \ldots, N\}$, $chal=\{\eta_{\vartheta_1}, \eta_{\vartheta_2}, \ldots, \eta_{\vartheta_\theta}, \lambda, \mu\}$ is a sequence of random matching coefficients of length $\vartheta$.

S42. The cloud server generates cloud-level aggregate ciphertexts, which include the first aggregate ciphertext $CT=\Pi_{\vartheta \in L}CT_\vartheta$, the second aggregate ciphertext $PCT=\Pi_{\vartheta \in L}e(CT_\vartheta, CT_\vartheta)$ and the third aggregate ciphertext $SCT=\Pi_{\vartheta \in L}SCT_\vartheta$.

S43. The cloud server uses random coefficients $\lambda$ and $\mu$, the cloud-level aggregate ciphertext to produce two random values $\eta_{\vartheta_\theta+1}=h_1(CT\|\lambda)$ and $\eta_{\vartheta_\theta}=h_1(PCT\|SCT\|\mu)$. And it gets the signatures $\{\sigma_{\vartheta_1}, \sigma_{\vartheta_2}, \ldots, \sigma_{\vartheta_\theta}\}$ of fog-level aggregate ciphertexts from database according to list L and computes an aggregate signature $\sigma=\Sigma_{\vartheta \in L}(\eta_\vartheta H_1(ID_{CS})+\sigma_\vartheta)$.

S44. The cloud server computes a combined hash value as $h=\Sigma_{\vartheta \in L}h_1(CT_\vartheta\|SCT_\vartheta)$ and a combined public key as $Y=\Sigma_{\vartheta \in L}Y_\vartheta$.

S45. The cloud server sends the response data $Agg=\{\sigma, h, Y, CT, PCT, SCT\}$ to the control center.

S5. Verification and Decryption: The control center firstly verifies the response information returned by the cloud server to confirm the data integrity of cloud-level aggregate ciphertext. If the verification passes, the control center decrypts the aggregate ciphertext and further computes the arithmetic mean and variance of all users' electricity consumption data within the specified user area list.

In the step S5 of some implementation instances, the control center uses the key-leakage resilient homomorphic decryption algorithm to decrypt the response data.

The aforementioned step S5 includes:

S51. The control center uses random coefficients $\lambda$ and $\mu$, and the cloud-level aggregate ciphertext to produce $\eta_{\vartheta_\theta+1}=h_1(CT\|\lambda)$ and $\eta_{\vartheta_\theta}=h_1(PCT\|SCT\|\mu)$ in the same way, and computes the sum of random matching coefficients as $\eta=\Sigma_{\vartheta \in L}\eta_\vartheta$, then it verifies the signatures by the following verification equation:

$$\tilde{e}(\sigma,P)=\tilde{e}((h+\eta)H_1(ID_{CS}),P) \cdot \tilde{e}(H_1(ID_{CS}),Y)$$

S52. If the verification equation in step S51 passes, the control center uses key-leakage resilient decryption algorithm to compute the discrete logarithm of $CT^{p_1}$ of base $\hat{g}=g^{p_1}$, and divides the result by $\ell+1$ to get the sum M of all users' electricity consumption data in the user areas specified in the user area list, namely $M=\log_{\hat{g}}^{CT^{p_1}}/(\ell+1)$.

S53. The control center uses private key $p_1$ to compute discrete logarithms $\log_{\hat{e}}^{SCT^{p_1}}$ and $\log_{\hat{e}}^{PCT^{p_1}}$ respectively, where $\hat{e}=e(g, g)^{p_1}$ is a bilinear map value, and computes the sum of squares of all users' electricity consumption data in the user areas specified in the user area list, namely $M^2 = \Sigma_{\vartheta \in L} \Sigma_{j=1}^{l} m_{\vartheta_j}^2 = \log_{\hat{e}}^{SCT^{p_1}} - (l+2) \cdot (\log_{\hat{e}}^{PCT^{p_1}}/(\ell+1)^2)$.

S54. The control center computes the arithmetic mean of all users' data as $$\bar{m} = \frac{M}{\theta \cdot \ell}.$$

S55. The control center computes the variance of all users' data as $$\text{var}(m) = \frac{M}{\theta \cdot \ell} - \bar{m}^2.$$

Each user area in this implementation instance is supervised by a fog node which plays the role of a data aggregate gateway and a data relay. All encrypted data sent by smart meters in the user area are aggregated for the first time by the fog node to generate a fog-level aggregate ciphertext. Then the fog node computes a signature for the fog-level aggregate ciphertext and sends all data to the cloud server for long-time storage. The cloud server stores all fog-level aggregate ciphertexts and signatures of different user areas in the database and provides data query service for the control center of smart grids.

The correctness of this implementation instance is proved as follows:

Let $M_\vartheta = \Sigma_{j=1}^{l} m_{\vartheta_j}$, $M_\vartheta^2 = (\Sigma_{j=1}^{l} m_{\vartheta_j})^2$, $R_\vartheta = \Sigma_{j=1}^{l} r_{\vartheta_j}$, $M = \Sigma_{\vartheta \in L} M_\vartheta$, $R = \Sigma_{\vartheta \in L} R_\vartheta$, $M^2 = \Sigma_{\vartheta \in L} \Sigma_{j=1}^{l} m_{\vartheta_j}^2$.

The correctness of equation for data integrity verification is proved as follows:

$$\hat{e}(\sigma, P) = \hat{e}\left(\sum_{\vartheta \in L}(\eta_\vartheta H_1(ID_{CS}) + \sigma_\vartheta), P\right)$$

$$= \hat{e}\left(\sum_{\vartheta \in L}(\eta_\vartheta + y_\vartheta + h_1(CT_\vartheta \| SCT_\vartheta))H_1(ID_{CS}), P\right)$$

$$= \hat{e}\left(\sum_{\vartheta \in L}(\eta_\vartheta + h_1(CT_\vartheta \| SCT_\vartheta))H_1(ID_{CS}), P\right) \cdot$$

$$\hat{e}\left(\sum_{\vartheta \in L} y_\vartheta H_1(ID_{CS}), P\right)$$

$$= \hat{e}((h+\eta)H_1(ID_{CS}), P) \cdot \hat{e}\left(H_1(ID_{CS}), \sum_{\vartheta \in L} y_\vartheta P\right)$$

$$= \hat{e}((h+\eta)H_1(ID_{CS}), P) \cdot \hat{e}(H_1(ID_{CS}), Y)$$

The correctness of computing statistical information M by the control center is proved as follows:

$$CT^{p_1} = \left(\prod_{\vartheta \in L} CT_\vartheta\right)^{p_1}$$

$$= \left(\prod_{\vartheta \in L} C_\vartheta^\ell \cdot c_\vartheta\right)^{p_1}$$

$$= \left(\prod_{\vartheta \in L}(f^{\pi_\vartheta} \varepsilon^{s_\vartheta} c_\vartheta)^\ell \cdot c_\vartheta\right)^{p_1}$$

$$= \left(\prod_{\vartheta \in L}(f^\beta \varepsilon^\delta g^{M_\vartheta} \xi^{R_\vartheta})^\ell \cdot \prod_{j=1}^{\ell} c_{\vartheta j}\right)^{p_1}$$

-continued $$= \left(\prod_{\vartheta \in L} g^{(\ell+1)M_\vartheta} \xi^{(\ell+1)R_\vartheta}\right)^{p_1}$$

$$= \left(g^{(\ell+1) \cdot \Sigma_{\vartheta \in L} M_\vartheta} \xi^{(\ell+1) \cdot \Sigma_{\vartheta \in L} R_\vartheta}\right)^{p_1}$$

$$= (g^{p_1})^{(\ell+1) \cdot M} = \hat{g}^{(\ell+1) \cdot M}$$

So $M = \log_{\hat{g}}^{CT^{p_1}} /(\ell+1)$.

The correctness of computing statistical information $M^2$ by the control center is proved as follows:

$$PCT^{p_1} = \left(\prod_{\vartheta \in L} e(CT_\vartheta, CT_\vartheta)\right)^{p_1}$$

$$= \left(\prod_{\vartheta \in L} e\left(g^{(\ell+1)M_\vartheta} \xi^{(\ell+1)R_\vartheta}, g^{(\ell+1)M_\vartheta} \xi^{(\ell+1)R_\vartheta}\right)\right)^{p_1}$$

$$= \left(\prod_{\vartheta \in L}(e(g, g))^{((\ell+1)M_\vartheta)^2} \cdot \right.$$

$$\left. e(g, \xi)^{2(\ell+1)M_\vartheta \cdot (\ell+1)R_\vartheta + p_2((\ell+1)R_\vartheta)^2}\right)^{p_1}$$

$$= \left(e(g, g)^{(\ell+1)^2 \Sigma_{\vartheta \in L} M_\vartheta^2} \cdot \right.$$

$$\left. e(g, \xi)^{\Sigma_{\vartheta \in L}(2(\ell+1)M_\vartheta \cdot (\ell+1)R_\vartheta + p_2((\ell+1)R_\vartheta)^2)}\right)^{p_1}$$

$$= \hat{e}^{(\ell+1)^2 \Sigma_{\vartheta \in L} M_\vartheta^2}$$

$$SCT^{p_1} = \left(\prod_{\vartheta \in L} SCT_\vartheta\right)^{p_1}$$

$$= \prod_{\vartheta \in L} SCT_\vartheta^{p_1}$$

$$= \prod_{\vartheta \in L}\left(\prod_{j=1}^{\ell} e(c_{\vartheta j} C_\vartheta, c_{\vartheta j} C_\vartheta)\right)^{p_1}$$

$$= \prod_{\vartheta \in L}\left(\prod_{j=1}^{\ell} e(g^{m_{\vartheta j}+M_\vartheta} \xi^{r_{\vartheta j}+R_\vartheta}, g^{m_{\vartheta j}+M_\vartheta} \xi^{r_{\vartheta j}+R_\vartheta})\right)^{p_1}$$

$$= \prod_{\vartheta \in L}\left(\prod_{j=1}^{\ell}(e(g, g))^{(m_{\vartheta j}+M_\vartheta)^2} \cdot \right.$$

$$\left. e(g, \xi)^{2(m_{\vartheta j}+M_\vartheta)(r_{\vartheta j}+R_\vartheta)+p_2(r_{\vartheta j}+R_\vartheta)^2}\right)^{p_1}$$

$$= \prod_{\vartheta \in L}\left(e(g, g)^{\Sigma_{j=1}^{\ell}(m_{\vartheta j}+M_\vartheta)^2} \cdot \right.$$

$$\left. e(g, \xi)^{\Sigma_{j=1}^{\ell}(2(m_{\vartheta j}+M_\vartheta)(r_{\vartheta j}+R_\vartheta)+p_2(r_{\vartheta j}+R_\vartheta)^2)}\right)^{p_1}$$

$$= \prod_{\vartheta \in L} \hat{e}^{\Sigma_{j=1}^{\ell}(m_{\vartheta j}+M_\vartheta)^2}$$

$$= \hat{e}^{\Sigma_{\vartheta \in L} \Sigma_{j=1}^{\ell}(m_{\vartheta j}+M_\vartheta)^2}$$

$$= \hat{e}^{\Sigma_{\vartheta \in L} \Sigma_{j=1}^{\ell}(m_{\vartheta j}^2 + 2M_\vartheta + M_\vartheta^2)}$$

$$= \hat{e}^{\Sigma_{\vartheta \in L} \Sigma_{j=1}^{\ell} m_{\vartheta j}^2 + 2\Sigma_{\vartheta \in L} M_\vartheta + \Sigma_{j=1}^{\ell} m_{\vartheta j} + \ell \Sigma_{\vartheta \in L} M_\vartheta^2}$$

$$= \hat{e}^{M^2 + 2\Sigma_{\vartheta \in L} M_\vartheta^2 + \ell \Sigma_{\vartheta \in L} M_\vartheta^2}$$

$$= \hat{e}^{M^2 + (\ell+2) \cdot \Sigma_{\vartheta \in L} M_\vartheta^2}$$

So $M^2 = \log_{\hat{e}}^{SCT^{p_1}} - (\ell+2) \cdot (\log_{\hat{e}}^{SCT^{p_1}}/(\ell+1)^2)$.

The aforementioned contents are just the prior implementation of this invention. It is to be understood that this invention is not limited to the forms disclosed herein, and is not to be construed as excluding other embodiments, but is capable of use in various other combinations, modifications, and environments and is capable of modifications within the scope of the teachings presented herein or the skill or knowledge of the relevant art. It is intended that the present invention cover the modifications and variations of this invention provided they come within the spirit and scope of the appended claims.

The invention claimed is:

1. A method for statistical analysis of aggregate encrypted data with key-leakage resilience for smart grids, comprising:

S1. System Initialization: A trust center generates security parameters, and allocates public-private key pairs to each of communication entities; wherein the communication entities comprise smart meters, fog nodes, a cloud server and a control center; then the trust center publishes all public parameters of the security parameters and sends private keys of the public-private key pairs to corresponding communication entities via a secure channel;

S2. Data Reporting: Each smart meter encrypts electricity consumption data to generate a ciphertext, generates a digital signature for the ciphertext and sends the ciphertext and the digital signature as reported data to a corresponding fog node for data aggregation; wherein each fog node is assigned to a predefined user area involving a plurality of smart meters;

S3. Fog-level Aggregation: After receiving all reported data from the smart meters in the predefined user area in a prespecified period, each fog node firstly verifies all the digital signatures of received reported data to determine whether the digital signatures are valid; i the digital signatures are valid, the fog node aggregates all the ciphertexts of the received reported data to generate fog-level aggregate ciphertext and signs an aggregate value of the fog-level aggregate ciphertext to generate a fog-level signature; then the fog node sends the fog-level aggregate ciphertext and the fog-level signature as fog-level aggregate data of the predefined user area to the cloud server for long-time storage;

S4. Data Analysis Request and Response: The control center sends a challenge message which includes a user area list for data analysis and a random chosen coefficient sequence to the cloud server; the cloud server gets fog-level aggregate data corresponding to the user areas listed in the user area list from a database of the cloud server according to the user area list; then the cloud server generates a cloud-level aggregate ciphertext, signs an aggregate value of the cloud-level aggregate ciphertext to generate verifiable response information using the fog-level signatures and the random chosen coefficient sequence; and then sends the cloud-level aggregate ciphertext and the verifiable response information to the control center;

S5. Verification and Decryption: The control center verifies the verifiable response information returned by the cloud server to determine whether the cloud-level aggregate ciphertext is complete; if the cloud-level aggregate ciphertext is complete, the control center decrypts the aggregate ciphertext and further computes arithmetic mean and variance of all users' electricity consumption data within the specified user area list.

2. The method according to claim 1, wherein the security parameters comprise security parameters of a key-leakage resilient homomorphic encryption algorithm and security parameters of a linear homomorphic digital signature algorithm.

3. The method according to claim 1, wherein each smart meter combines a random blinding technique with a key-leakage resilient homomorphic algorithm to encrypt users' electricity consumption data in step S2 and uses a privacy-preserving decryption algorithm to decrypt the response data in step S5.

4. The method according to claim 1, wherein each fog node uses a batch verification method to check data integrity of the received data in step S3.

5. The method according to claim 1, wherein the step S1 includes:

S11. Given a security parameter k, the trust center generates parameters of a key-leakage resilient homomorphic encryption algorithm (n, g, G, $G_T$, e), where $e: G \times G \rightarrow G_T$ is an admissible bilinear pairing map, G and $G_T$ are both cyclic groups with composite order n, and $n = p_1 p_2$, $p_1$ and $p_2$ are both big prime numbers with k-bit length, g is a generator of tag group G; The trust center computes a public key of the control center as $\xi = g^{p_2}$;

S12. The trust center determines an elliptic curve E over the finite field $F_p$ and another bilinear pairing map ê: $G_1 \times G_1 \rightarrow G_2$ based on E, where p is a big prime number, $G_1$ is an additive cyclic group with order q, $G_2$ is a multiplicative cyclic group with order q; The trust center selects a generator P of the group $G_1$, and sets the number of fog nodes to be N and the number of smart meters in each user area to be 1; The trust center sets two secure collision-resistant hash functions: $H_1: \{0, 1\}^* \rightarrow G_1$, $h_1: \{0,1\}^* \rightarrow Z_q^*$, where $\{0,1\}^*$ denotes the set of binary strings with arbitrary length, $Z_q^*$ is the multiplicative cyclic group which is composed of residue systems relatively prime to q;

S13. The trust center randomly chooses five constants: $\alpha$, $\beta$, $\gamma$, $\delta$, $\zeta$ satisfying $\alpha \cdot \beta + \gamma \cdot \delta + \zeta = n$, where $\alpha \in Z_n$, $\beta \in Z_n$, $\gamma \in Z_n$, $\delta \in Z_n$, $\zeta \in Z_n$, computes public parameters $f = g^\alpha$ and $\varepsilon = g^\gamma$; Besides, the trust center selects a private key $y_i \in Z_q$ for digital signature algorithm for each fog node $FN_i$ and computes a corresponding public key $Y_i = y_i P$ for signature verification;

S14. For each smart meter $SM_{ij}$ with a unique identifier $ID_{SM_{ij}}$, the trust center randomly selects a private key $y_{ij} \in Z_q$ for digital signature, where $Z_q$ is a ring of residue classes modulo q, $SM_{ij}$ is the j-th smart meter in the user area corresponding to the i-th fog node $FN_i$; The trust center computes the public key $Y_{ij} = y_{ij} P$ for signature verification for $SM_{ij}$, and selects two random numbers $\pi_{ij}$ and $s_{ij}$ for each $SM_{ij}$, where $\pi_{ij} \in Z_n$, $s_{ij} \in Z_n$, $\alpha \cdot \pi_{ij} + \gamma \cdot s_{ij} = \zeta$, $\Sigma_{j=1}^l \pi_{ij} \leq \beta$, $\Sigma_{j=1}^l s_{ij} \leq \delta$, and then computes two parameters $\pi_i = \beta - \Sigma_{j=1}^l \pi_{ij}$ and $s_i = \delta - \Sigma_{j=1}^l s_{ij}$ for each fog node $FN_i$;

S15. The trust center sends the private key $p_1$ to the control center, sends private key $y_{ij}$, secret parameters $\pi_{ij}$ and $s_{ij}$ to corresponding smart meter $SM_{ij}$, and sends private key $y_i$, secret parameters $\pi_i$ and $s_i$ to corresponding fog node $FN_i$ via the secure channel, respectively.

6. The method according to claim 5, wherein the step S2 includes:

S21. each smart meter $SM_{ij}$ with a unique identifier $ID_{SM_{ij}}$ randomly selects ciphertext as $SCT_i = \Pi_{j=1}^l e(c_{ij} C_i, c_{ij} C_i)$;

S34. The fog node $FN_i$ computes a fog-level digital signature as $\sigma_i = (y_i + h_1(CT_i \| SCT_i)) H_1(ID_{CS})$, where $ID_{CS}$ is a unique identifier of the cloud server; and S35. The fog node $FN_i$ sends all the aggregate data $\{CT_i, SCT_i, \sigma_i\}$ to the cloud server for long-time storage.

7. The method according to claim 6, wherein the step S3 includes:

S31. After receiving data $\{ID_{SM_{ij}}, c_{ij}, \sigma_{ij}, t_{ij}\}$ from all smart meters $SM_{ij}$, j=1, 2, K, 1' of the user area in the prespecified period, the fog node $FN_i$ verifies all the signatures $\sigma_{ij}$ sent by all smart meters $SM_{ij}$ using the following verification equation:

$$\hat{e}\left(\sum_{j=1}^{\ell}\sigma_{ij}, P\right) = \sum_{j=1}^{\ell}\hat{e}(H_1(ID_{SM_{ij}}\|c_{ij}\|t_{ij}), Y_{ij});$$

S32. If the verification equation in step S31 passes, then the fog node $FN_i$ computes the first intermediate state ciphertext as $c_i = \Pi_{j=1}^{\ell} c_{ij}$ and the second intermediate state ciphertext as $C_i = f^{\pi_i} \varepsilon^{s_i} c_i$;

S33. The fog node $FN_i$ generates fog-level aggregate ciphertexts, which include the first fog-level aggregate ciphertext as $CT_i = C_i^{1} \cdot c_i$ and the second fog-level aggregate and a combined public key as $Y = \Sigma_{\vartheta \in L} Y_{\vartheta}$; and S45. The cloud server sends the response data Agg={$\sigma$, h, Y, CT, PCT, SCT} to the control center.

8. The method according to claim 7, wherein the step S4 includes:

S41. The control center generates a challenge message {L, chal}, and sends it to the cloud server, where L is a list of user areas, L={$\vartheta_1$, $\vartheta_2$, K, $\vartheta_\theta$} $\subseteq$ {1, 2, K, N}, chal={$\eta_{\vartheta_1}$, $\eta_{\vartheta_2}$, K, $\eta_{\vartheta_{\theta \cdot 2}}$, $\lambda$, $\mu$} is a sequence of random matching coefficients of length $\theta$;

S42. The cloud server generates cloud-level aggregate ciphertexts, which include the first aggregate ciphertext $CT = \Pi_{\vartheta \in L} CT_\vartheta$, the second aggregate ciphertext $PCT = \Pi_{\vartheta \in L} e(CT_\vartheta, CT_\vartheta)$ and the third aggregate ciphertext $SCT = \Pi_{\vartheta \in L} SCT_\vartheta$;

S43. The cloud server uses random coefficients $\lambda$ and $\mu$, and the cloud-level aggregate ciphertext to generate two random values $\eta_{\vartheta_{\theta\cdot 1}} = h_1(CT\|\lambda)$ and $\eta_{\vartheta_\theta} = h_1(PCT\|SCT\|\mu)$; and gets the signatures {$\sigma_{\vartheta_1}$, $\sigma_{\vartheta_2}$, K, $\sigma_{\vartheta_\theta}$} of fog-level aggregate ciphertexts from database according to list L and computes an aggregate signature $\sigma = \Sigma_{\vartheta \in L}(n_\vartheta H_1(ID_{CS}) + \sigma_\vartheta)$;

S44. The cloud server computes a combined hash value as $h = \Sigma_{\vartheta \in L} h_1(CT_\vartheta\|SCT_\vartheta)$ a number $r_{ij} \in Z_n$ and generates a ciphertext as $c_{ij} = f^{\pi_{ij}} \varepsilon^{s_{ij}} g^{m_{ij}} \zeta^{r_{ij}} \in G$, where $m_{ij} \in [0, MAX]$ is the electricity consumption data of user, MAX is a prespecified upper bound of all users' electricity consumption data, MAX is less than $p_2$;

S22. The Smart meter $SM_{ij}$ acquires current timestamp $t_{ij}$, and uses the private key $y_{ij}$ to compute a digital signature as $\sigma_{ij} = y_{ij} H(ID_{SM_{ij}} \| c_{ij} \| t_{ij})$; and S23. The smart meter $SM_{ij}$ sends {$ID_{SM_{ij}}$, $c_{ij}$, $\sigma_{ij}$, $t_{ij}$} to the corresponding fog node $FN_i$.

9. The method according to claim 8, wherein the step S5 includes:

S51. The control center uses random coefficients $\lambda$ and $\mu$, and the cloud-level aggregate ciphertext to generate $\eta_{\vartheta_{\theta\cdot 1}} = h_1(CT\|\lambda)$ and $\eta_{\vartheta_\theta} = h_1(PCT\|SCT\|\mu)$, and computes the sum of random matching coefficients as $\eta = \Sigma_{\vartheta \in L} \eta_\vartheta$, then verifies the signatures by the following verification equation:

$$\hat{e}(\sigma, P) = \hat{e}(h+\eta) H_1(ID_{CS}), P) \cdot \hat{e}(H_1(ID_{CS}), Y);$$

S52. If the verification equation in step S51 passes, the control center uses key-leakage resilient decryption algorithm to compute the discrete logarithm of $CT^{p_1}$ of base $\hat{g} = g^{p_1}$, and divides the result by 1+1 to get the sum M of all users' electricity consumption data in the user areas specified in the user area list, namely $M = \log_{\hat{g}}^{CT^{p_1}} / (1+1)$;

S53. The control center uses private key $p_1$ to compute discrete logarithms $\log_{\hat{e}}^{SCT^{p_1}}$ and $\log_{\hat{e}}^{PCT^{p_1}}$ respectively, where $\hat{e} = e(g, g)^{p_1}$, is a bilinear map value, and computes the sum of squares of all users' electricity consumption data in the user areas specified in the user area list, namely $M^2 = \Sigma_{\vartheta \in L} \Sigma_{j=1}^{\ell} m_{\vartheta_j}^2 = \log_{\hat{e}}^{SCT^{p_1}} - (1+2) \cdot (\log_{\hat{e}}^{PCT^{p_1}} / (1+1)^2)$;

S54. The control center computes the arithmetic mean of all users' data as $$\bar{m} = \frac{M}{\theta \cdot 1};$$

and

S55. The control center computes the variance of all users' data as $$\text{var}(m) = \frac{M^2}{\theta \cdot 1} - \bar{m}^2.$$

* * * * *